Figure 1:
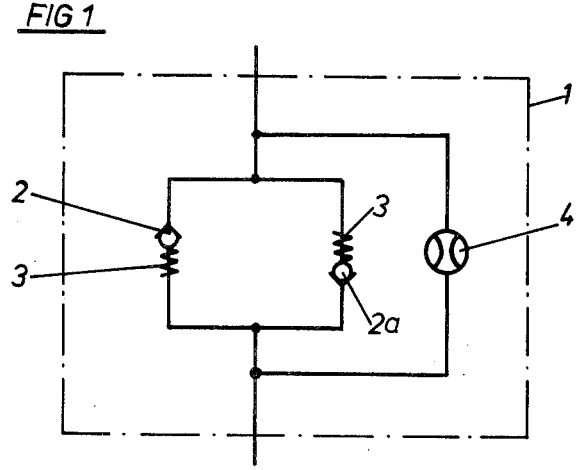

United States Patent [19]

Wetter

[11] 4,161,115

[45] Jul. 17, 1979

[54] APPARATUS FOR MONITORING HYDRAULIC PLANT FOR LEAKAGES

[75] Inventor: Jakob Wetter, Düsseldorf, Fed. Rep. of Germany

[73] Assignee: Sack GmbH, Düsseldorf, Fed. Rep. of Germany

[21] Appl. No.: 853,588

[22] Filed: Nov. 21, 1977

[30] Foreign Application Priority Data

Nov. 22, 1976 [DE] Fed. Rep. of Germany ....... 2653020

[51] Int. Cl.² .............................................. G01M 3/08
[52] U.S. Cl. ................................................. 73/40.5 R
[58] Field of Search ........................... 73/40.5 R, 199; 137/512.1, 551

[56] References Cited

U.S. PATENT DOCUMENTS

| | | | |
|---|---|---|---|
| 2,043,227 | 6/1936 | Bennett | 73/40.5 R X |
| 3,454,028 | 7/1969 | Boatrup | 137/512.1 X |
| 3,969,923 | 7/1976 | Howell | 73/40.5 R |

Primary Examiner—Charles Gorenstein
Attorney, Agent, or Firm—John J. Dennemeyer

[57] ABSTRACT

Apparatus is provided for detecting leakages in hydraulic equipment. A pressure supply line of the equipment has alternate fluid flow paths controlled by respective, oppositely directed non-return or one-way valves which are pre-loaded as by springs. A restricted flow transducer is located in a bypass line which bypasses the alternate fluid flow paths for sensing pressure drops in the system.

3 Claims, 5 Drawing Figures

APPARATUS FOR MONITORING HYDRAULIC PLANT FOR LEAKAGES

The invention relates to an apparatus for monitoring a hydraulic plant for internal and external leakages, such as occur from hose and pipe fractures, where the problem occurs frequently, namely when pressurized consumers pressurized operating fluids such as cylinders and hydraulic motors are in their inactive mode, i.e. in their inoperative position. In practice it has been found that losses of the pressure medium, from a hydraulic plant mainly occur in the inoperative phase, because the full pressure can build up at this time and also lasts for a longer period of time, since the working phase is generally substantially shorter than the inoperative phase.

Flow monitors are known for monitoring streams of fluid or liquid flowing through a conduit, which as a signal-emitting transducer emit a measurement signal proportional to the flow, as in the case of transducers which operate according to the turbine or displacement principle for example. Differential pressure transducers are also known, which operate according to the throttle or restrictor principle. With this differential pressure method, the measurement signal, of digital or analog type, is proportional to the pressure drop which is caused by the flow of fluid through the reduced cross section of the throttle or restrictor. However, the pressure drop necessary for measurement is frequently undesirable, so that one can only work with small pressure drops and the measuring range and accuracy are thus limited.

It is common to all known flow transducers that they emit a reasonably and sometimes very accurate measurement signal for their rated flow range, but that in the case of extremely small fluid or liquid streams, in relation to the flow therethrough, they emit only an inaccurate or no measurement signal. Added to this is the fact that the susceptibility to breakdown of flow meters operating according to the displacement or turbine principle is relatively great, in proportion to other hydraulic components, and that the breakdown of a flow meter in the main stream generally leads to the stoppage of the entire plant.

Normal flow monitors used in practice as flow transducers, whose range of measurement is generally limited to a ratio of 1:10, therefore have an appreciable drawback when monitoring pressure medium losses. On the other hand, during the movement phase of the consuming device, they should allow the entire, i.e. the maximum possible stream of fluid or liquid to pass, without the signal emitted being evaluated for indicating leakage of oil caused, for example, by a pipe fracture. But on the other hand, in the inoperative position of the consuming device, they should monitor the pressurized consuming device such that both the smallest leakages of the consuming device as well as large leakages (for example, from a pipe fracture) record a useful fault signal. This is certainly not possible with flow transducers known and used hitherto. Flow transducers which fulfil this requirement should have an extremely large measuring range with simultaneous high resolution and high accuracy.

It is the object of the invention to construct a flow measuring device which allows the rated flow to pass to or from the consuming device without an appreciable pressure drop at the measuring device, whereas in the case of very small streams of fluid or liquid, a measurement signal is emitted which is accurate and as far as possible proportional to the stream of fluid or liquid.

This object is fulfilled according to the invention due to the fact that in the supply pipe to the consuming device, after or before a control valve, a measurement device or unit is installed that includes a flow transducer for a relatively small throughflow. The flow transducer is connected in parallel with pre-tensioned throughflow valves, preferably non-return or one-way valves connected in anti-parallel, which are sized to accommodate the rated flow of the consuming device. The specific flow characteristic of the non-return or one-way valves limits the partial stream through the flow transducer to any value which can be predetermined, and the arrangement is such that the maximum possible flow through the measurement device or unit is not limited by the size of the flow transducer. The fluid circuit arrangement of the measurement device thus makes it possible to allow large streams of liquid to flow through the non-return valves, and in the case of small streams of liquid to obtain accurate measurement signals by way of the flow transducer with a small throughput and high resolution. Thus, the maximum possible flow value can be determined optionally by the size of the two non-return or one-way valves, whereas the relatively small flow value, with which a measurement signal should be recorded, is determined exclusively by the size of the flow transducer. The supply of pressure medium to the consuming device thus takes place by way of one of the valves and the flow transducer, whereas at the time of the return stroke of the consuming device, for example of a cylinder, the quantity of liquid displaced by the piston can be discharged through the other valve, which is connected in anti-parallel to the first valve and through the flow transducer.

It is important for the operation of the circuit of the invention that the non-return or one-way valves are pre-tensioned, which is normally achieved by springs, since to achieve the desired flow characteristic in the non-return valves connected in anti-parallel, depends both on the non-return effect as well as on the pressure-limiting effect due to pre-tensioning. On the basis of this fact, according to a further development of the invention, the interconnection of two directly controlled pressure-limiting valves connected in anti-parallel with a flow transducer connected in parallel is appropriate.

When using the measuring device according to the invention with the interconnection of valves and a flow transducer, it is also possible to take advantage of the fact that even when the flow transducer, which is susceptible to trouble, breaks down, the plant can continue to be operated, namely solely by way of the valves, whereby in the short term, i.e. until the next repair, monitoring of small oil losses is no longer possible.

According to the invention it is intended to use a flow monitor as the flow transducer, which monitor is dimensioned such that with a rated flow, the pressure drop at the pressure transducer is identical to the response pressure of the two pre-tensioned non-return or pressure-limiting valves.

The invention and the respective flow characteristics are described in detail hereafter with reference to the drawings and the illustrated circuits and diagrams.

Figure 2:
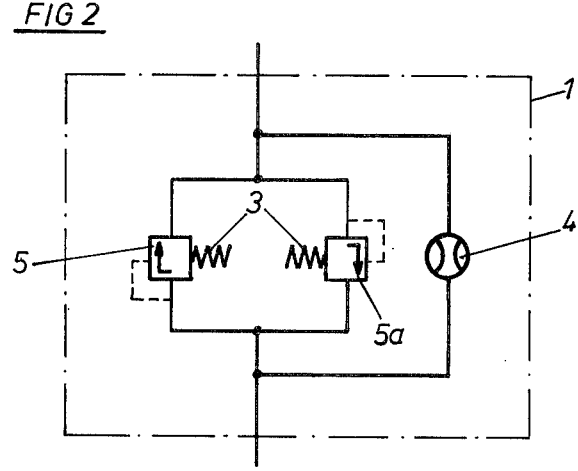
Figure 3A:
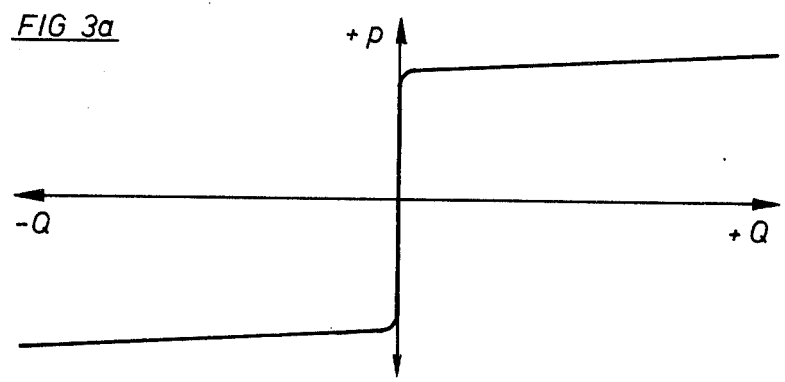
Figure 3B:
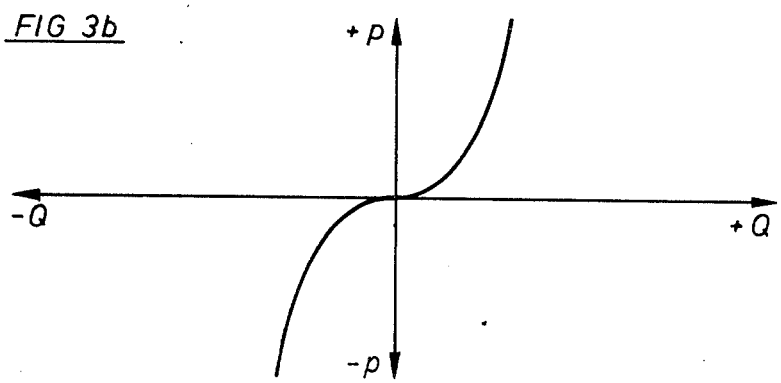
Figure 3C:
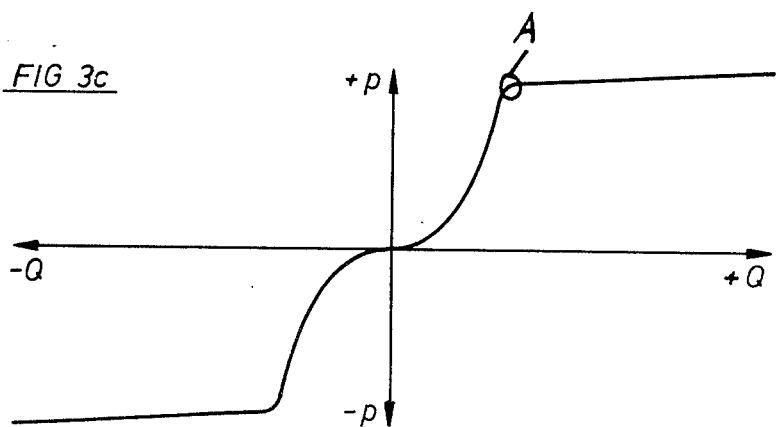

FIG. 1 shows the measuring device according to the invention with non-return or one-way valves connected in anti-parallel to each other, and in parallel with said measuring device, FIG. 2 shows the measuring device with pressure-limiting valves connected in anti-parallel to each other, and in parallel with said measuring device, FIG. 3a is a typical pressure/flow diagram for a non-return valve or pressure-limiting valve, FIG. 3b is a typical pressure/flow diagram for a flow monitor, and FIG. 3c is a pressure/flow diagram for a measuring device connected according to the invention.

In FIGS. 1 and 2, the circuit and co-ordination of the measuring device are represented by symbols conventional in hydraulics. FIG. 1 shows a measuring device 1 inserted in the supply pipe to a consuming device (not shown) of a hydraulic plant, with two non-return or one-way valves 2, 2a connected in anti-parallel, which are each pre-tensioned by a spring 3. A flow monitor 4 is located parallel to the non-return valves 2. In contrast thereto, the circuit according to FIG. 2 shows a measuring device 1, in which the non-return valves 2 (FIG. 1) are replaced by spring-loaded pressure-limiting valves 5, 5a connected in anti-parallel, which are likewise connected parallel to the flow monitor 4.

The pressure/flow behaviour of the entire measuring device 1 as well as that for a non-return valve or pressure-limiting valve 2, 2a, 5, 5a and for a flow monitor 4 is shown in FIGS. 3a to 3c. The diagram according to FIG. 3a for a non-return or pressure-limiting valve shows that due to pre-tensioning by means of the springs 3, a flow through the valves is only possible when the pressure of a flow quantity Q of fluid exceeds the pre-set pressure p established by the springs 3, the valves having large dimensions and being designed for the throughput of large quantities of liquid when open, in order to facilitate desired good constant pressure behaviour. FIG. 3b shows the flow characteristic for a flow monitor 4, and it can be seen how in the case of relative slight increases in fluid flow quantities Q, the resulting pressure p increases very considerably.

Finally, the diagram according to FIG. 3c shows the pressure/flow characteristic of the measuring device according to the invention, the curve resulting from the addition or superimposition—as is the case at the point A of the illustrated curve according to FIG. 3c, of the partial streams travelling through the non-return valve or pressure-limiting valve 2, 5 and the flow monitor 4. That is, the point A indicates opening of one of the valves 2, 5, which then accommodates the major flow through the measurement device or unit. The flow monitor is thus designed such that the rated throughput can be kept in a very narrow range. When the quantity of fluid or liquid Q flowing through the measurement device or unit 1 reaches a predetermined pressure p sufficient to open the valve, the fluid or liquid is thereafter supplied to the consuming device by way of the non-return valve or pressure-limiting valve 2, 5, the valves being pre-tensioned such that they only respond and allow a throughput on reaching the predetermined pressure. During the movement phase of the consuming device, the entire stream of liquid is thus guided by way of a valve 2, 5 and the flow monitor 4, but seen overall, with regard to the total stream, only a very small partial stream passes through the flow monitor, due to which it is possible to considerably restrict the measurement range of the flow monitor and thus to considerably increase the accuracy when monitoring the consuming device which is under pressure in the inoperative phase, so that even the smallest leakages of the consuming device produce a useful fault signal. Since it is only possible for liquid to flow though a non-return valve or pressure-limiting valve in one direction, at the time of the return stroke of the consuming device of a hydraulic plant, the second non-return or pressure-limiting valve 2a, and 5a connected in anti-parallel to the first valve 2, 5 opens and allows the discharge of the quantity of liquid, whereupon a new operating cycle can begin.

What is claimed is:

1. Apparatus for detecting leakages in hydraulic equipment, said apparatus being insertable into a conduit for supplying fluid under pressure to said hydraulic equipment and being arranged to detect leakage flows in either direction through said conduit, and including:
    (a) an inlet;
    (b) an outlet;
    (c) first and second conduit means connected and arranged to define alternate flow paths for pressurized fluid between said inlet and said outlet;
    (d) first and second pre-loaded one-way valve means connected in said first and said second conduit means, respectively, and arranged oppositely to each other so that each of said first and said second conduit means will accommodate flow in only one direction therethrough, the preload on said valve means being such that as pressure rises in either direction no fluid will flow until a threshold point is reached;
    (e) third conduit means located between said inlet and said outlet and connected to form a by-pass flow path around said first and said second conduit means; and
    (f) a restricted flow monitor connected in said third conduit means, constructed and arranged to detect fluid leakages in both directions of fluid flow through said apparatus, the flow through said third conduit and said monitor being such that as pressure rises the fluid flow will increase until the capacity of said third conduit and said monitor is reached;
    (g) whereby the apparatus will provide fluid flow at an increasing rate in either direction through said third conduit and said monitor as the pressure increases until the pressure increases to the point that one of said valves opens.

2. Apparatus as claimed in claim 1, wherein the valves are non-return valves.

3. Apparatus as claimed in claim 1, wherein the valves are directly controlled pressure-limiting valves.

* * * * *